Aug. 7, 1962    P. R. ADAMS ETAL    3,048,044
SYSTEM FOR SUPPORTING AND/OR CONTROLLING BODIES
Filed Jan. 28, 1958    4 Sheets-Sheet 1

Inventors
PAUL R. ADAMS
ETIENNE C. L. de FAYMOREAU
By *Percy P. Lantry*
Attorney

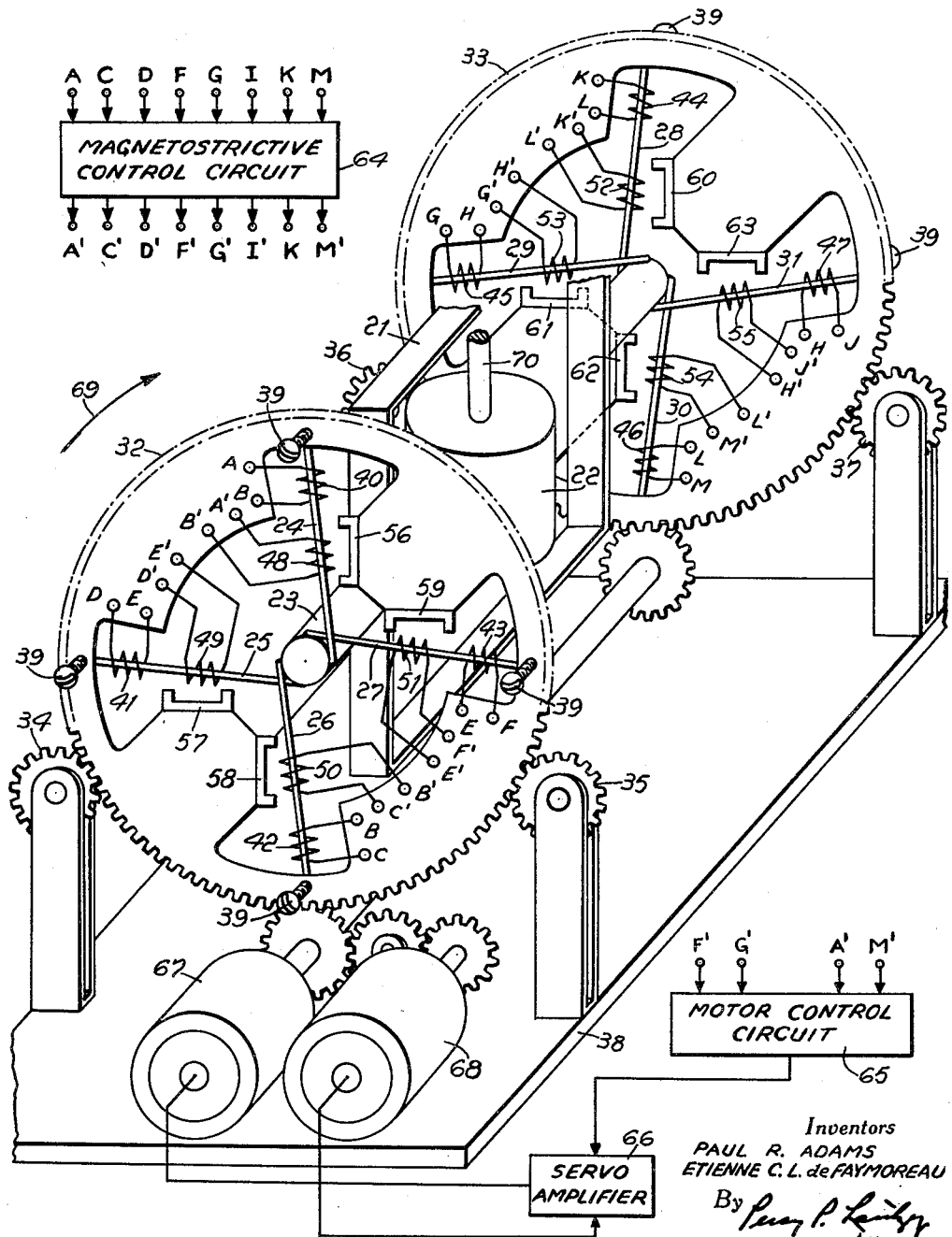

Inventors
PAUL R. ADAMS
ETIENNE C. L. de FAYMOREAU

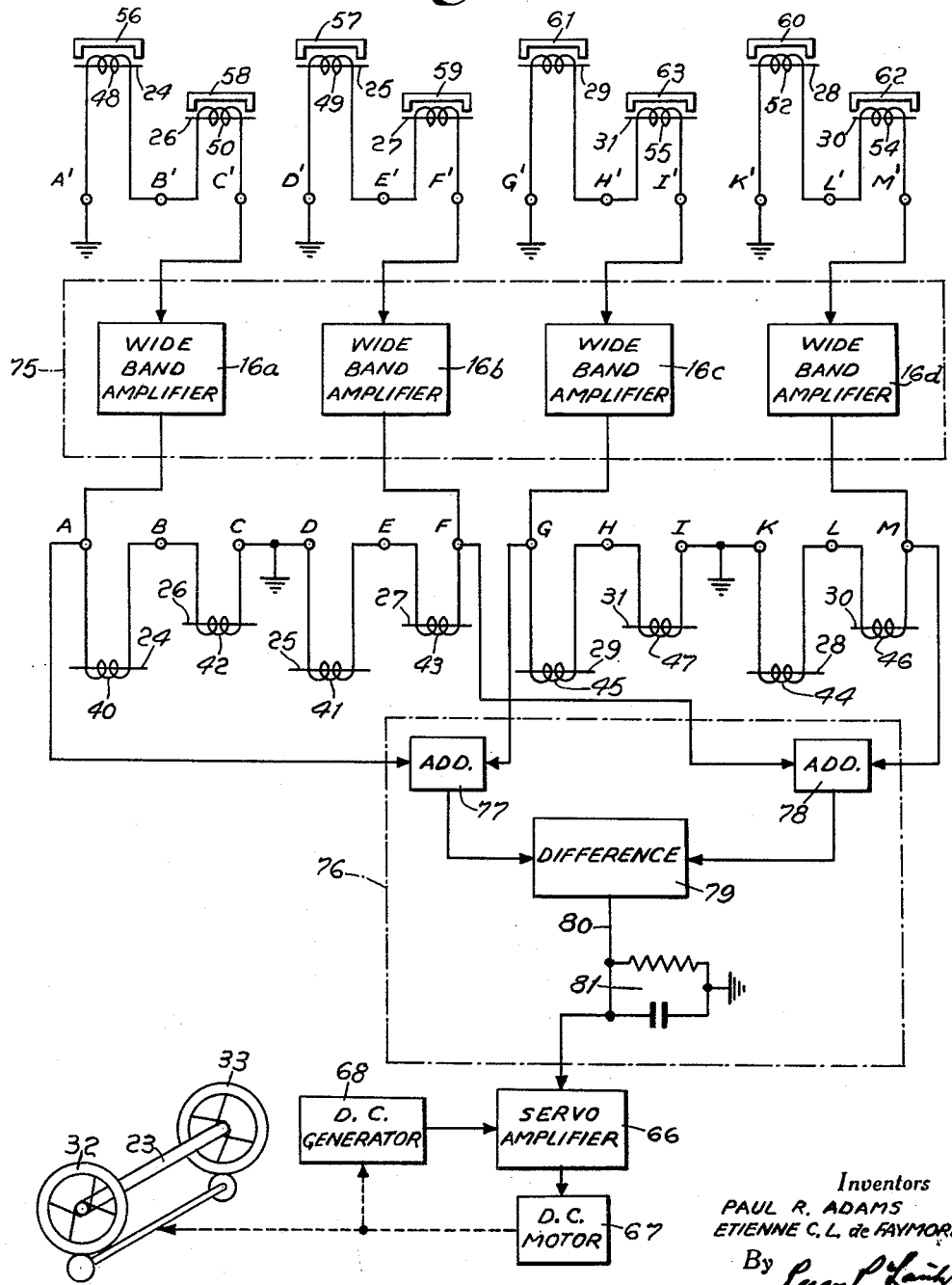

United States Patent Office 3,048,044
Patented Aug. 7, 1962

3,048,044
SYSTEM FOR SUPPORTING AND/OR
CONTROLLING BODIES
Paul R. Adams, Northridge, Calif., and Etienne C. L. de Faymoreau, Nutley, N.J., assignors to International Telephone and Telegraph Corporation, Nutley, N.J., a corporation of Maryland
Filed Jan. 28, 1958, Ser. No. 711,740
11 Claims. (Cl. 74—5.47)

This invention relates to the support and/or control of bodies in general, utilizing electro-mechanical transducers, and specifically to the support and/or control of gyroscopes.

In many instances it is desirable to eliminate certain effects produced by forces applied to, or exerted by, a body. For example, for certain purposes it is desirable to support a body motionlessly with respect to a spatial frame of reference despite small translational, rotational or vibrational motion of its supporting frame; or conversely, it may be desirable to prevent such motions of the supported body from being transmitted to the supports. On the other hand, there are many cases where it is desirable to support a body freely so as to be able to move without friction or restraint by its supporting frame. A typical example of the latter occurs in the use of gyroscopes, particularly for inertial guidance purposes. Here any friction or restraint, particularly of the bearings supporting the gyroscope precession or output axis, introduces small errors which, due to the cumulative effect of errors in inertial guidance systems, tend to become quite important.

In certain types of gyros, such as the integrating or displacement gyro, any torque on the input axis of the gyro (by rotation of the outer case thereof) causes a precession movement around the gyroscope output axis which is sensed by electrical means and used to control a motor which rotates the casing of the gyro in such a direction as to "null out" the torque applied to the gyroscope input axis. In one form of such gyros, the gyros are supported on wire filaments which are twisted and/or stretched slightly whenever the outer case of the gyro is displaced relative to the inner gyro element. This twisting and/or stretching is sensed by a pickoff located on the outer case and generates an error signal which is fed to a servomotor, which motor in turn rotates the outer case until it is again aligned with the inner element, thereby untwisting and/or relieving stretch in the supporting filaments and nulling out the input axis torque. One of the difficulties with gyro systems of the type referred to is that the servomotor response is delayed in bringing the system to a null due to the time required for the motor to develop torque. This introduces a certain amount of delay and error into the system.

An object of the present invention is the provision of an improved support and/or control means for physical bodies.

Another object of the present invention is the provision of an improved support and/or control means for physical bodies which substantially eliminates the transfer of forces resulting from small translational, rotational or vibrational movements of the body with respect to its supporting frame or vice versa.

Another object of the present invention is the provision of a support and/or control means for gyroscopes which is substantially frictionless and eliminates the use of bearings with their friction, for at least the gyroscope's precession or output axis.

A further object of the present invention is the provision of a support and/or control means for gyroscopes in which a fast-acting means is provided for eliminating the initial strain on certain types of gyroscope supports due to rotation of a gimbal or the outer casing thereof about the input axis and a slower follow-up system, such as a motor system, which compensates for further rotational movement by rotating the gimbal or outer casing in a direction to null the effects of the torque acting about the gyro input axis.

According to one feature of the present invention, use is made of an electro-mechanical transducer, such as, for example, magnetostrictive means, to support and/or control a body.

According to a further aspect of the present invention, the stressing of an electro-mechanical transducer having a magnetostrictive element produces an electrical signal which is fed back to said element to relieve the strain on said element.

Another aspect of the present invention is the provision of an electro-mechanical transducer, which may be used in conjunction with a follow-up device, such as motor means, for controlling relative movements of bodies or, stated another way, for allowing the movement of one body without restraint by another body with which it is connected by said transducer.

Other and further objects of the present invention will become apparent and the foregoing will be better understood with reference to the following description of embodiments thereof, reference being had to the drawings, in which:

FIG. 3 is a partially schematic isometric view of a device for suspending a gyroscope housing at an axis whereby precession about said axis is unopposed by friction;

Figure 2A:
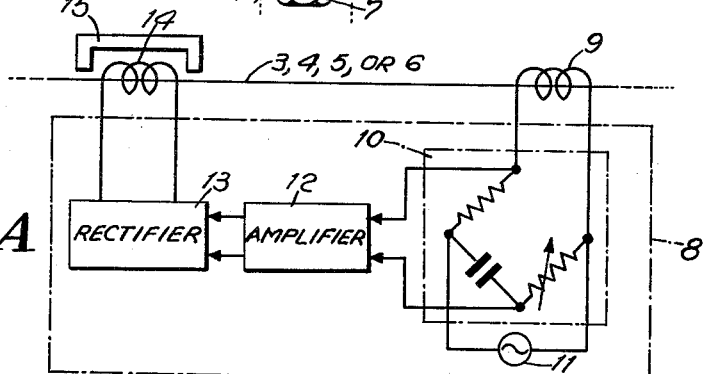
FIG. 2A is an electrical schematic and block diagram of a detecting and control system for maintaining constant tension in a magnetostrictive wire, such as, for example, is employed in FIG. 1.
Figure 2B:
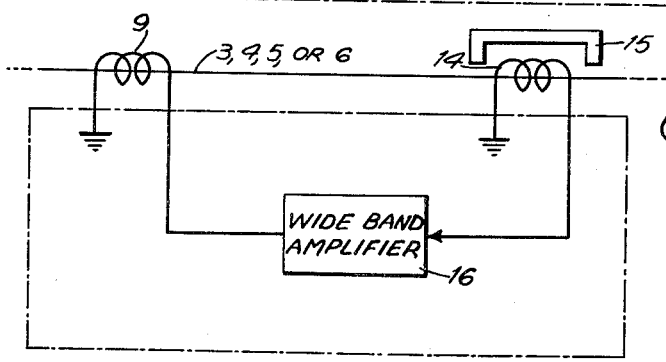
FIG. 2B is an electrical schematic and block diagram of another detecting and control system for maintaining constant tension in a magnetostrictive wire, such as, for example, is employed in FIG. 1.
Figure 4:
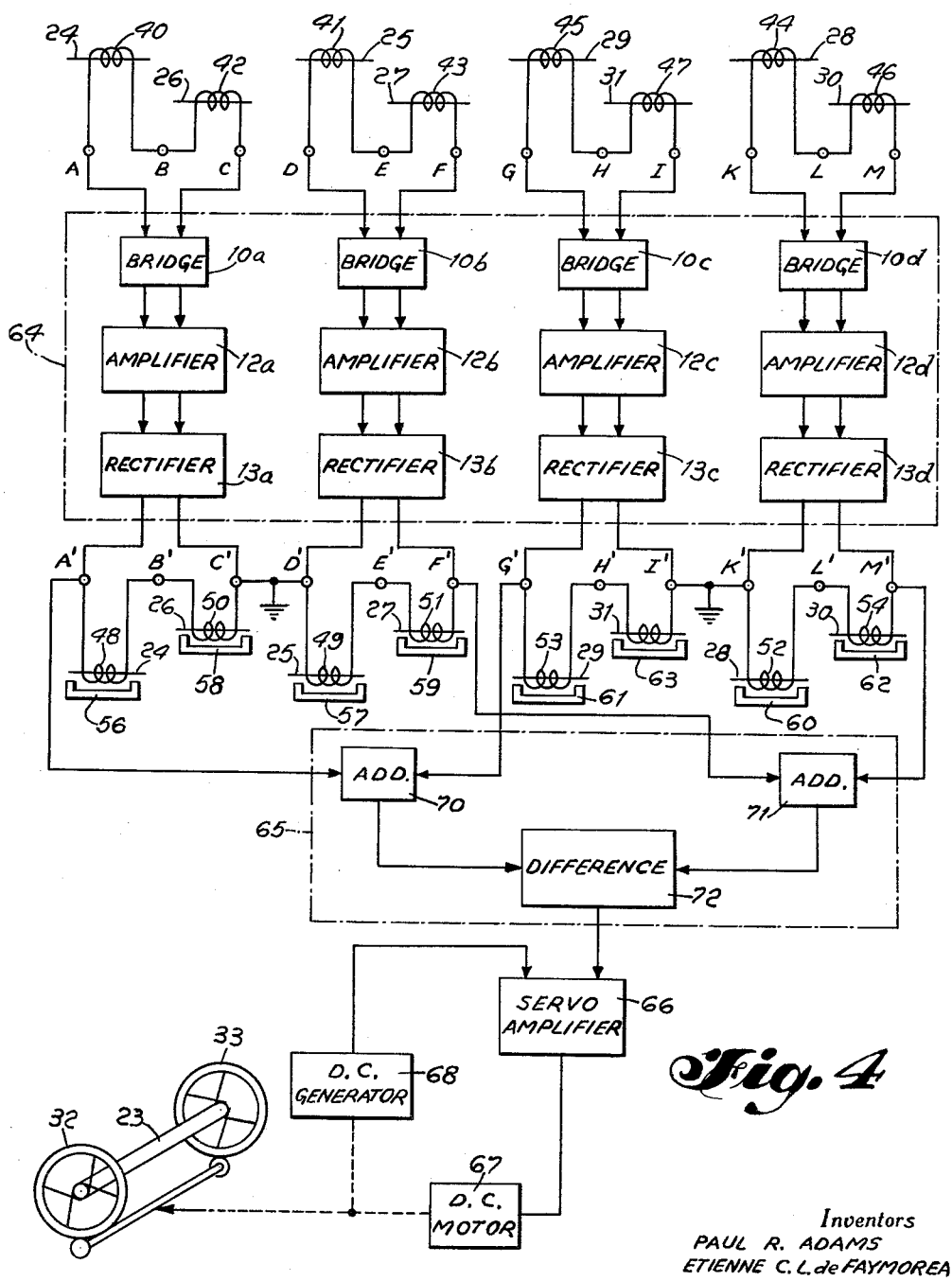

FIG. 4 is a detailed schematic and block diagram of a magnetostriction and servomotor control system based upon the technique taught in FIG. 2A, that may be employed in conjunction with the device shown in FIG. 3; and FIG. 5 is a detailed schematic and block diagram of a magnetostriction and servomotor control system based upon the technique taught in FIG. 2B, that may be employed in conjunction with the device shown in FIG. 3.

Figure 1:
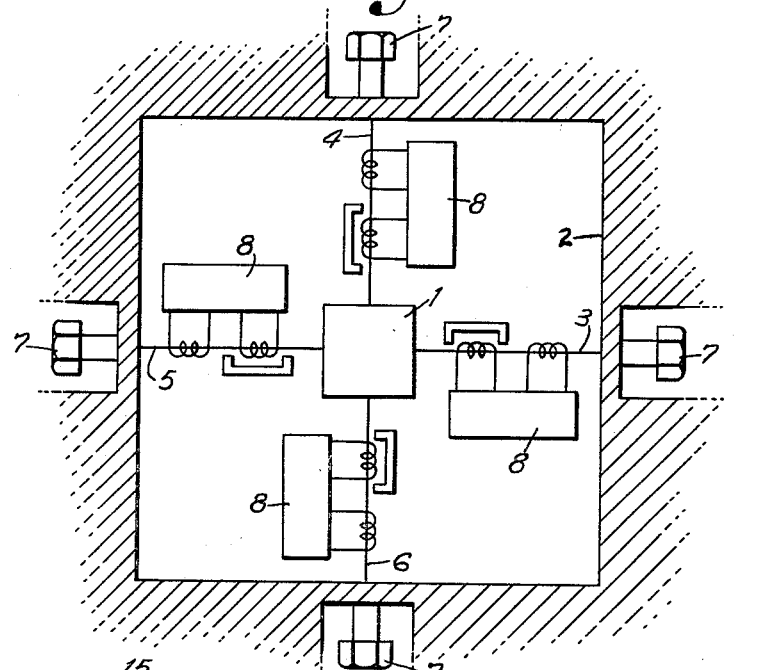
FIG. 1 is a partially schematic plan view of a device for isolating the effects of relative motion of two bodies where the first body is suspended from the second body by magnetostrictive wires.

Referring now to FIG. 1, there is shown a system for maintaining a first body 1 motionless with respect to a second body 2 from which the first body is suspended by a plurality of magnetostrictive wires, such as 3, 4, 5 and 6, each of which is initially adjusted in tension by associated set screws 7. When the second body 2 is caused to move from rest with a motion of small amplitude, which may be of high frequency, the tension in one or more of magnetostrictive wires 3, 4, 5 and 6 changes because the first body 1 tends to remain at rest. Consider now the operation of control device 8 of which there is one to sense and control tension in each of the magnetostrictive wires 3, 4, 5 and 6. An electric schematic of one system that may be used as control divce 8 is shown in FIG. 2A and another in FIG. 2B.

Referring to FIG. 2A, as tension in a magnetostrictive wire changes, the magnetic properties of the wire change causing the inductance of coil 9 to change. Coil 9 is inductively coupled with the magnetostrictive wire and forms one leg of a bridge circuit 10; therefore, a change in inductance of coil 10 causes a change in A.C. voltage output of bridge circuit 10. For this purpose an A.C. voltage from a source 11 is applied to one set of opposite terminals of the bridge 10, the other set providing an A.C. output. The A.C. output from bridge circuit 10 is applied to A.C. amplifier 12 whose output is coupled to rectifier 13 which rectifies the amplified signal and applies it to coil 14. A change in the input to amplifier 12 causes a change in the D.C. current to coil 14. Coil 14 is preferably coupled with the magnetostrictive wire in such a manner that the magnetic field produced by coil 14 is parallel with the wire and so that an increase in D.C. current to coil 14 causes the magnetostrictive wire to elongate. Magnet 15 is oriented so that its magnetic field is also parallel to the magnetostrictive wire causing an initial degree of magnetostriction and elongation of the wire so that further magnetostriction caused by the magnetic field of coil 14 is more effective. Thus it is seen that an increase in tension in the magnetostrictive wire as sensed by coil 9 results in an increase in D.C. current to coil 14 causing the magnetostrictive wire to elongate counteracting or nulling the initial increase in tension.

Referring now to FIG. 2B, there is shown another control system that may be employed as control device 8 for controlling tension in magnetostrictive wires 3, 4, 5 or 6. As shown in FIG. 2B, coil 14 is inductively coupled to the magnetostrictive wire and to the permanent magnet 15 so that a change in tension in the wire changes the magnetic field of the magnet which is inductively coupled with coil 14, thus inducing a pulse in coil 14 which is applied to wide band amplifier 16. Amplifier 16 amplifies this pulse and applies it to coil 9 which is inductively coupled to the magnetostrictive wire so that the magnetic field from coil 9 causes magnetostriction in the wire. Thus, the pulse from coil 14 causes a magnetostriction change in the wire, and this change is such to reduce the first-mentioned change in tension.

Referring again to FIG. 1, if tension in each wire is maintained constant in either of the above-described manners described with reference to FIGS. 2A and 2B, the first body 1 supported solely by magnetostrictive wires 3, 4, 5 and 6 will not move in response to small amplitude motion of second body 2. Obviously, other electromechanical transducer devices could be employed in place of the magnetostrictive wires including other types of magnetostrictive wires which contract in length when subjected to a magnetic field rather than elongate.

Referring now to FIG. 3, there is shown a system for suspending a vertically spinning gyroscope at an axis of precession in such a manner and provided with such controls that precession occurs without opposition of friction. Gyroscope housing 21, containing the vertically spinning gyroscope 22 (driven by means not shown) is suspended for rotation about the precession axis concentric with precession axle 23 by a multiplicity of magnetostrictive wires 24 to 31. Axle 23 consists of shafts fixed to and extending from opposite sides of housing 21. Four of the magnetostrictive wires are attached tangentially to each end of axle 23 and project therefrom in a plane preferably perpendicular to axle 23 in the fashion of the spokes of a wheel. The other end of each magnetostrictive wire is attached to one or the other of rotating precession rings 32 and 33 as shown in FIG. 3. Rings 32 and 33 are held by idler gears 34, 35 and 36, 37, respectively, which are mounted on a supporting structure 38 which may be fixed to a vehicle. These idler gears serve to limit the motion of rings 32 and 33 in all degrees of freedom with respect to the supporting structure except the one of rotation about the precession axle 23. Eight tension screws 39, or other suitable means, may be provided in the rings to make initial adjustment of tension in each of the eight magnetostrictive wires 24 to 31. Coils 40 to 47, which are inductively coupled with magnetostrictive wires 24 to 31, respectively, are provided to detect changes in tension or to cause magnetostriction changes in each magnetostrictive wire depending on whether the magnetostriction control circuit shown in FIG. 2A or FIG. 2B, respectively, is employed. Coils 48 to 55, inductively coupled with magnetostrictive wires 24 to 31 and with magnets 56 to 63, respectively, are provided to cause magnetostriction in each wire or to detect tension changes in each wire, depending on whether the magnetostriction control circuit, shown in FIG. 2A or FIG. 2B, respectively, is employed. If the control circuit 8 shown in FIG. 2A is employed, then magnets 56 to 63, which are magnetically coupled to the magnetostrictive wires 24 to 31, respectively, cause a constant initial amount of magnetostriction in each wire, thus causing those wires to elongate an initial amount. Terminals coupled to each coil are designated by primed or unprimed symbols so that where the same primed symbol, for example, designates two different terminals, it indicates they are connected together.

Precession of gyroscope 22 about axle 23 relative to support structure 38 may be measured by any system that does not introduce friction or other resistance to the precession motion of the gyroscope. One frictionless method of measuring this precession motion is to attach reflecting means to housing 21 to reflect a light beam from a source fixed to structure 38 and to provide light sensitive detection means, also attached to structure 38, to detect the position of the light beam. This beam position would be indicative of the rotary position of gyroscope 22 relative to structure 38.

If magnetostriction in each wire 24 to 31 is controlled by a system such as shown in FIG. 2A and described hereinabove with reference to FIG. 2A, then the coils 40 to 47 serve to detect tension changes in their associated magnetostrictive wires, while coils 48 to 55 serve to change magnetostriction in the wires. To achieve this, magnetostriction control circuit 64 and servomotor control circuit 65 are provided. The output of circuit 64 energizes coils 48 to 55 with D.C. current causing magnetostriction in magnetostrictive wires 24 to 31 in such a manner that any small change in tension in these wires caused by the rotation of housing 21 about precession axle 23 is instantly nulled and housing 21 containing gyroscope 22 is allowed to start precession about axle 23 without opposition by friction. Circuit 64 also provides electrical signals, derived from coils 40 to 47, which are fed to servomotor control circuit 65 which adds appropriate signals to obtain two sums, then detects the difference between the two sums, yielding a signal which energizes a follow-up servo loop consisting of servo amplifier 66, servomotor 67, and generator 68. Motor 67 is mechanically coupled with rings 32 and 33 and drives the rings together in the same direction to maintain a tension balance between magnetostrictive wires 24 to 31 so that precession is allowed to continue unopposed. The motor 67 drives until the difference between the two sums computed by motor control circuit 65 is zero. The electrical connections between the coils and a schematic of circuits 64 and 65 for a system where magnetostriction is controlled, as taught by FIG. 2A, are shown in FIG. 4.

Referring now to both FIG. 3 and FIG. 4 for the description of a system where magnetostriction is controlled as taught by FIG. 2A, it is seen that certain of coils 40 to 47, which are coupled with opposing magnetostrictive wires on the same precession ring, are connected in series, and certain of coils 48 to 55, which are coupled with opposing wires on the same ring, are also connected in series. It is also apparent that a rotation of precession axle 23 in the direction of arrow 69 causes an increase in tension in magnetostrictive wires 24, 26, 29 and 31 and a decrease in tension in magnetostrictive wires 25, 27, 28 and 30. In order that these increases and decreases in tension may serve to energize follow-up servomotor 67 only when gyroscope 22 attempts to rotate about precession axle 23, it is required that the inductance of tension detecting coils coupled to two opposing magnetostrictive wires which are attached to the same precession ring be detected together yielding one signal which serves to energize magnetostriction coils coupled to the same two opposing wires. One method of accomplishing this is shown in FIG. 4 where tension detecting coils coupled to opposing magnetostrictive wires are coupled in series and magnetostriction coils coupled to opposing magnetostrictive wires are also coupled in series. It is also preferable for proper operation that the net change (algebraic sum change) in tension in opposing magnetostrictive wires on ring 32 be added with the net change in tension in opposing magnetostrictive wires on ring 33 which are orientated perpendicular to the pair on ring 32. For example, if housing 21 would move upward in the direction of the spin axis 70 of gyroscope 22, tension in magnetostrictive wires 24 and 28 would decrease while tension in wires 26 and 30 would increase and tension in wires 25, 27, 29 and 31 would change together by the same amount. Therefore, the algebraic sum *change* in tension in magnetostrictive wires 24+26+29+31 would be the same as the algebraic sum *change* in tension in magnetostrictive wires 28+30+25+27, and the difference between these two sums would be unchanged by the upward motion of gyroscope housing 21 in the direction of spin axis 70. In a like manner, it can be seen that any translational or rotational motion of gyroscope housing 21, *other than rotation about precession axle 23*, will cause the same algebraic sum *change* in tension in wires 24+26+29+31 as in the wires 28+30+25+27. Therefore, circuit 65, which takes the difference between these algebraic sums, will yield a zero output *change* as a result of any changes in forces or moments imposed on housing 21 except moments about precession axle 23; and motor 67, which is energized by the output of circuit 65 via servo amplifier 66, will drive precession rings 32 and 33 only in response to tension changes in the magnetostrictive wires 24 to 31 which are caused by forces tending to rotate housing 21 about precession axle 23.

Referring again to FIG. 4, there is shown detail schematics of magnetostriction control circuit 64 and motor control circuit 65. Circuit 64 is composed of four identical bridge circuits 10a, 10b, 10c and 10d (such as also is shown in FIG. 2A) measuring the series or sum inductance of opposing coils which form pairs 40 and 42, 41 and 43, 45 and 47, and 44 and 46, respectively. All of these bridge circuits are energized by an A.C. generator such as 11 shown in FIG. 2A. The A.C. outputs of the bridge circuits are proportional to the sum inductance of the outermost coils coupled to opposing magnetostrictive wires and, thus, these outputs are functions of the sum tension in opposing magnetostrictive wires 24 and 26, 25 and 27, 29 and 31, and 28 and 30, respectively. These bridge circuit outputs are fed to amplifier circuits 12a, 12b, 12c, and 12d, respectively, where the A.C. signals are amplified and fed to rectifiers 13a, 13b, 13c, and 13d, respectively, which yield D.C. currents to energize pairs of magnetostriction coils 48 and 50, 49 and 51, 53 and 55, and 52 and 54, respectively. Each of rectifier circuits 13a, 13b, 13c, and 13d also feed a D.C. signal proportional to the sum inductance of said pairs of coils to one of summing circuits 70 or 71 of motor control circuit 65. Circuit 65 is composed of two D.C. summing circuits, 70 and 71, and a D.C. difference circuit 72. Circuit 71 adds D.C. signals proportional to the sum inductance of coils 40, 41, 45 and 47 as fed from terminals A' and G', while summing circuit 71 adds D.C. signals proportional to the sum inductance of coils 41, 43, 44 and 46 as fed from terminals F' and M'. The outputs of summing circuits 70 and 71 are fed to difference circuit 72 which yields an output proportional to the difference between the outputs of the summing circuits. The output of summing circuit 72 is fed to servo amplifier 66 which energizes follow-up servomotor 67 which drives precession rings 32 and 33 to maintain the summation of tension in magnetostrictive wires 24+26+29+31 equal to the summation of tension in magnetostrictive wires 28+30+25+27, thus allowing gyroscope 22 to precess without opposition by friction.

FIG. 5 illustrates the application of another method for controlling magnetostriction in magnetostrictive wires 24 to 31 such as taught by FIG. 2B, and the application of another method for controlling servomotor 67. FIG. 5 may be taken in conjunction with FIG. 3 except that magnetostriction control circuit 64 and motor control circuit 65 shown in FIG. 3 should be disregarded and their equivalent circuits 75 and 76, respectively, connected as shown in FIG. 5, should be substituted. In FIG. 5 pairs of coils 48 and 50, 49 and 51, 53 and 55, and 52 and 54, respectively, coupled to magnetostrictive wires 24, 26, 25, 27, 29, 31, 28 and 30, respectively, and inductively coupled to permanent magnets 56, 58, 57, 59, 61, 63, 60 and 62, respectively, and serving to detect sum tension changes in opposing pairs of magnetostrictive wires, are coupled to wide band amplifiers 16a, 16b, 16c and 16d, respectively, while the outputs of these wide band amplifiers are coupled to and energize pairs of coils 40 and 42, 41 and 43, 45 and 47, and 44 and 46, respectively, to cause magnetostriction and thus tension changes in the same aforementioned opposing pairs of magnetostrictive wires. The outputs of wide band amplifiers 16a and 16c are also fed, via terminals A and G, respectively, to summing circuit 77, while the outputs of wide band amplifiers 16b and 16d are fed, via terminals F and M, respectively, to summing circuit 78. Circuits 77 and 78 each sum their inputs and feed signals to difference circuit 79. Thus, the output of difference circuit 79 is indicative of changes in tension in magnetostrictive wires 24 to 31 resulting from the tendency of gyroscope housing 21 to precess about axle 23.

The output of circuit 79 is coupled to servo amplifier 66 via line 80. RC circuit 81 is provided, coupling line 80 to ground, to integrate the signal from difference circuit 79. This integration is required because the signals from circuit 79 are actually pulses representative of the rate of change of tension in the magnetostrictive wires 24 to 31 which is caused by the tendency of gyroscope 22 to precess about axle 23. The R and C values of circuit 81 and the gain of servo amplifier 66 are adjusted so that servomotor 67, which is energized by amplifier 66, drives precession rings 32 and 33 to maintain the output of circuit 79 nulled, thus following up the effects of coils 40 to 47 which cause magnetostriction in said magnetostrictive wires.

The method of suspending a gyroscope at an axis of precession by a plurality of electro-mechanical transducers, such as magnetostrictive wires having suitable coils and magnets magnetically coupled thereto with appropriate magnetostriction control devices coupled to the coils, could also be employed in various ways to maintain a stable platform, such as is required in inertial guidance systems. For example, three gyroscope devices, each identical to that shown in FIG. 3, could be mounted to a platform along mutually perpendicular axes each providing a signal indicative of a gyroscope precession about one of the axes. Each signal indicative of precession would be fed to driving means coupled to the platform which would position the platform so as to null the signals indicative of precession. Each of these signals could be obtained from a precession measuring system including the combination of a mirror fixed to a gyroscope house and reflecting a beam which originates from a point that is fixed relative to the platform, so that the beam would impinge upon light-sensitive means also fixed to the platform yielding signals indicative of the point of impingement and, thus, indicative of precession. Each of these signals indicative of precession could also be obtained from electrical combinations of the coils which measure tension changes in the magnetostrictive wires suspending a gyroscope (see FIG. 3).

The method of suspending a gyroscope at an axis of precession by a plurality of mechanical transducers as taught in this invention could also be employed in many ways to maintain a single gyroscope stable in two degrees of rotational freedom. In this application combinations of the coils detecting tension changes in the magnetostrictive wires suspending one axle of the gyroscope, which might be called the precession axle, would yield signals indicative of precession about that precession axle. These signals could be employed to energize suitable magnetostriction control means applying signals to the coils which cause magnetostriction in the magnetostrictive wires suspending the other axle of the gyroscope which might be called the moment axle, so as to exert a torque on the gyroscope about the moment axle in opposition to the external moment which is causing said precession. Of course, in any application such as this, follow-up servo means responsive to signals from said tension detecting coils should be included.

While we have described the specific details of various systems, it is obvious that various changes may be made in keeping with the teachings thereof. For example, while we have referred to the magnetostrictive wire in which an increase of current through the coil coupled thereto causes elongation of the magnetostrictive wire, it will readily be apparent that wires having the opposite type of magnetostriction may be employed in which a decrease of current will cause elongation of the wire; and it will be quite obvious how this system may be altered to provide for this type of operation. Numerous other changes may occur in keeping with the teachings herein accordingly.

While we have described above the principles of our invention in connection with specific embodiments, it is to be clearly understood that this description is made only by way of example and not as a limitation to the scope of our invention as set forth in the objects thereof and in the accompanying claims.

We claim:

1. A system for detecting and controlling tension in an electro-mechanical transducer coupling two bodies together comprising first electrical means coupled to said transducer producing a signal indicative of the tension in said transducer, means coupled to said first electrical means for producing an electrical signal in response to said signal output of said first electrical means, second electrical means coupled to said transducer and responsive to said electrical signal for causing at least one dimension of said transducer to change so that said dimension changes are controlled by said electrical signal in response to said signal indicative of tension in a manner to counteract any change in the tension of said transducer.

2. A system for detecting and controlling tension in a member for coupling two or more other members comprising an electro-mechanical transducer disposed between said member and one of said other members, first electrical means coupled to said transducer for detecting tension changes in said transducer producing a signal indicative of said tension change, means coupled to said first electrical means for producing an electrical signal in response to said signal output of said first electrical means second electrical means coupled to said transducer and responsive to said electrical signal to cause dimension changes in said transducer so that said second electrical means is controlled by signals from said first electrical means to cause a change in said transducer in a manner to counteract any change in the tension of said transducer.

3. A system for supporting a first body from a second body whereby one of said bodies can be maintained motionless when the other body moves, comprising a plurality of magnetostrictive members connecting said first body to said second body and disposing said first body in a fixed position relative said second body when no external force is applied to said second body, first electrical means coupled to each said members to detect the tension in each member and producing signals indicative of the change in tension, second electrical means coupled to said members, control means coupling said first electrical means to said second electrical means and responsive to said signals to produce an electrical signal to activate said second electrical means to cause a dimension change in each of said members and so that said first means controls said second means maintaining tension in said members constant and said first body is maintained in said fixed position.

4. A system for supporting a first body from a fixed second body whereby said first body may rotate about a given axis in response to an external moment applied to said first body, comprising a first body and a second body, an axle fixed to said first body, a plurality of electromechanical transducer elements each coupled tangentially at one end to said axle and each coupled at its other end to said second body and disposing said first body in a fixed position relative said second body when no external moment is applied to said first body, first electrical means coupled to said transducer elements producing signals indicative of tension changes therein, second electrical means coupled to said transducer elements to cause dimension changes therein and electrical control means coupling said first electrical means with said second electrical means so that said signals indicative of tension changes induce an electrical signal output of said control means to cause said second electrical means to produce said dimension changes which oppose said tension changes allowing said first body to rotate about said axis in response to said external moment and maintain said first body in said fixed position.

5. A system for suspending a gyroscope comprising a gyroscope and gyroscope housing having an axle rigidly attached thereto, first and second supporting bodies disposed at either end of said axle, a multiplicity of magnetostrictive wires each attached tangentially to one of the ends of said axle and to the nearest of said supporting bodies, the arrangement being such that rotation of said gyroscope housing about said axle causes an increase in tension in some of said wires and a decrease in tension in the remaining ones of said wires, different coils inductively coupled to each of said wires to detect tension in said wires, different coils inductively coupled to each of said wires to cause magnetostriction in said wires, magnetostriction control means coupling said tension detecting coils with said magnetostriction causing coils so that magnetostriction in said wires is controlled by tension in said wires, motor means coupled to said supporting bodies to drive said supporting bodies, and motor control means coupling the output of said magnetostriction control means to said motor means so that said motor means drives said supporting bodies to maintain constant tension in said magnetostrictive wires.

6. A system for suspending a gyroscope as in claim 5 and further including a plurality of magnets each inductively coupled with one of said wires and one of said magnetostriction causing coils so as to cause an initial amount of magnetostriction in each of said wires.

7. A system for suspending a gyroscope as in claim 9 and further including a plurality of magnets each inductively coupled to a different one of said magnetostrictive wires and to a different one of said tension detecting coils so as to provide a magnetic field about said coil and said wire which changes as tension in the wire changes thereby inducing a current pulse in said coil.

8. A system for suspending a gyroscope at an axis of precession whereby said gyroscope may precess without opposition of friction comprising a gyroscope mounted to a gyroscope housing and having a precession axle attached thereto, axle supporting bodies at each end of said axle, means fixed to a platform to support said axle supporting bodies allowing said bodies to rotate about said precession axis, motor means fixed to said platform and mechanically coupled to said supporting bodies so as to drive said bodies about said precession axis, generator means mechanically coupled to said motor means, a multiplicity of magnetostrictive wires each coupled tangentially to one of the ends of said precession axle and lying in planes essentially perpendicular to said precession axis, each of said magnetostrictive wires being connected to one or the other of said supporting bodies, means to adjust tension in each of said magnetostrictive wires, a first plurality of coils each coupled inductively to a different one of said wires at one point on each wire, a second plurality of coils each inductively coupled to a different one of said wires at another point on said wire, each of said first plurality of coils which are inductively coupled to wires fastened to opposite ends of one of said supporting bodies being connected in series, control means coupling said coils connected in series to coils of said second plurality of coils which are coupled to the same said wires fastened to opposite ends so that a change in tension in said wires fastened to opposite ends causes a change in magnetostriction in said wires fastened to opposite ends, signal adding means coupled to the output of each of said means to control, signal comparing means coupled to the output of each of said signal adding means and means coupling the output of said comparing means to said motor means, said coupling means being also coupled to said generator means and responsive to a signal therefrom so that said motor means drives said supporting bodies in rotation about said precession axis so as to null the signal from said comparing means in response to tension changes in said multiplicity of wires resulting from the tendency of said housing to rotate about said precession axis.

9. A system for supporting a first body from a second body whereby one of said bodies can be maintained motionless when the other body moves comprising magnetostrictive means coupling said bodies together and disposing said first body in a fixed position relative said second body when no external force is applied to either of said bodies, means coupled to said magnetostrictive means for detecting a tension change in said magnetostrictive means producing a first signal indicative of said tension change, means coupled to said detecting means for producing a second signal in response to said first signal, electrical means coupled to said magnetostrictive means and responsive to said second signal for causing a dimension of said magnetostrictive means to change in accordance with said second signal so that said electrical means is controlled by said first signal from said detecting means to cause a change in said magnetostrictive means in a manner to counteract any change in the tension of said magnetostrictive means and maintain said one of said bodies in said fixed position.

10. A system for supporting a first body from a second body whereby one of said bodies can be maintained motionless when the other body moves comprising magnetostrictive means coupling said bodies together and disposing said first body in a fixed position relative said second body when no external force is applied to either of said bodies, first electrical means coupled to said magnetostrictive means producing a first signal indicative of the tension in said magnetostrictive means, means coupled to said first electrical means for producing a second signal in response to said first signal output of said first electrical means, second electrical means coupled to said magnetostrictive means and responsive to said second signal causing at least one dimension of said magnetostrictive means to change so that said changes are controlled by said second signal in response to said first signal indicative of tension in a manner to counteract any change in the tension of said magnetostrictive means and maintain said one of said bodies in said fixed position.

11. A system for supporting a first member from other members whereby said first member can be maintained motionless when the other members move comprising magnetostrictive means coupling said first member to said other members and disposing said first member in a fixed position relative said other members when no external force is applied to either of said members, first electrical means coupled to said magnetostrictive means for detecting tension changes in said magnetostrictive means producing a first signal indicative of said tension change, means coupled to said first electrical means for producing a second signal in response to said first signal output of said first electrical means, second electrical means coupled to said magnetostrictive means and responsive to said second signal to cause dimension changes in said magnetostrictive means so that said second electrical means is controlled by said first signal from said first electrical means to cause a change in said magnetostrictive means in a manner to counteract any change in the tension of said magnetostrictive means and maintain said first member in said fixed position.

References Cited in the file of this patent

UNITED STATES PATENTS

| | | |
|---|---|---|
| 1,750,124 | Pierce | Mar. 11, 1930 |
| 2,052,385 | Dollman | Aug. 25, 1936 |
| 2,511,178 | Roters | June 13, 1950 |
| 2,849,669 | Kinkel | Aug. 26, 1958 |
| 2,875,618 | Altman | Mar. 3, 1959 |